United States Patent [19]

Namimatsu et al.

[11] Patent Number: 5,615,955
[45] Date of Patent: Apr. 1, 1997

[54] LINEAR GUIDE APPARATUS WITH LUBRICANT-CONTAINING POLYMER SPACER BALLS

[75] Inventors: Ken Namimatsu; Toru Tsukada, both of Gunma; Toshikazu Yabe, Kanagawa, all of Japan

[73] Assignee: NSK Ltd., Tokyo, Japan

[21] Appl. No.: 571,713

[22] Filed: Dec. 13, 1995

[30] Foreign Application Priority Data

Dec. 16, 1994 [JP] Japan ..................................... 6-313643

[51] Int. Cl.$^6$ ................................................. F16C 29/06
[52] U.S. Cl. ............................... 384/13; 384/45; 384/521
[58] Field of Search ................................ 384/13, 45, 521, 384/44, 43

[56] References Cited

U.S. PATENT DOCUMENTS 3,027,626  4/1962  Murphy .................................. 29/148.4
4,181,375  1/1980  Ernst et al. ..
4,239,632  12/1980  Baile ........................................... 252/12
4,293,166  10/1981  Ernst et al. ..
5,228,353  7/1993  Katahira et al. ........................... 384/43

FOREIGN PATENT DOCUMENTS 60-175942  11/1985  Japan ............................... F16H 25/22
754844  2/1995  Japan ............................... F16C 29/06

*Primary Examiner*—Lenard A. Footland
*Attorney, Agent, or Firm*—Sughrue, Mion, Zinn, Macpeak & Seas

[57] ABSTRACT

In a self-lubrication linear guide apparatus including a guide rail, a slider and a plurality of rolling elements, the apparatus further includes a plurality of lubricant-containing polymer spacer balls which are interposed between the rolling elements inside the slider. A lubricant gradually exudes from the lubricant-containing polymer spacer balls as time elapses to be automatically supplied to the rolling elements, so that satisfactory self lubrication can be achieved over a long period of time.

7 Claims, 2 Drawing Sheets

LINEAR GUIDE APPARATUS WITH LUBRICANT-CONTAINING POLYMER SPACER BALLS

BACKGROUND OF THE INVENTION

The present invention relates to a linear guide apparatus and, in particular, to a self-lubrication linear guide apparatus that allows a lubricant to be automatically supplied to a plurality of rolling elements, which are component parts of the linear guide apparatus and which are rolling within a slider, over a long period of time.

An exemplary conventional linear guide apparatus for ordinary use includes, as shown in FIG. 4, an axially extending guide rail 1 that has rolling grooves 3 on outer surfaces thereof, and a slider 2 that is engaged with the guide rail 1 so as to mount over the guide rail 1. The slider 2 includes a slider main body 2A and end caps 2B attached to both end portions of the slider main body. The slider main body 2A has not only rolling grooves formed on the inner surfaces of both sleeve portions 4 thereof so as to confront the rolling grooves 3 of the guide rail 1, but also rolling element return grooves that pass through the thick-walled portions of the sleeve portions. Each end cap 2B has curved grooves that allow the rolling grooves of the slider main body 2A to communicate with the rolling element return grooves that extend in parallel with the rolling grooves of the slider main body 2A. Thus, the rolling grooves, the rolling element return grooves, and the curved grooves on both ends provide rolling element circulation circuits. A large number of balls, which are the rolling elements, are loaded into the rolling element circulation circuits. The rolling elements within the rolling grooves of the slider 2 are retained by a retainer so that the rolling elements avoid falling away from the slider 2 when the slider 2 is removed from the guide rail 1.

The slider 2 that is engaged with the guider rail 1 moves smoothly along the guide rail through the rolling of the rolling elements accommodated within both rolling grooves that confront each other, and during such movement the rolling elements are endlessly circulating throughout the rolling element circulation passages within the slider.

Grease or lubricating oil is charged into the slider 2 from a grease nipple 7, so that the rolling elements are lubricated.

However, in the conventional linear guide apparatus having such a lubrication system that lubricating oil or grease is used as a lubricant as it is, i.e., without giving any special arrangement, the lubricant is consumed quickly especially when the apparatus is operated at high temperatures because the lubricant charged into the slider does not stay but flows outside the apparatus. Therefore, the conventional linear guide apparatus has encountered the problem that the lubricant must be replenished repeatedly at short intervals.

SUMMARY OF THE INVENTION

The present invention has been made in view of such conventional problem. The object of the invention is, therefore, to provide a self-lubrication linear guide apparatus having long life which allows the lubricant to be automatically supplied to the rolling elements within the slider over a long period of time stably.

To achieve the above object, the present invention is applied to a self-lubrication linear guide apparatus that includes: an axially extending guide rail having a first rolling groove on its outer surface; a slider engaged with the guide rail and having a second rolling groove, rolling element return grooves and curved grooves, the second rolling groove confronting the first rolling groove, the rolling element return grooves being coupled to both end portions of the second rolling groove through the curved grooves, respectively; a plurality of rolling elements loaded into the slider to be made circulatable through the second rolling groove, the curved grooves, and the rolling element return grooves; and a plurality of spacer balls interposed between the rolling elements, the spacer balls being formed of lubricant-containing polymer.

Here the lubricant-containing polymer spacer ball is designed so that the polymer spacer ball can be interposed between the rolling elements and can serve both as a member for improving operability and as a lubricant supply source.

The self-lubrication linear guide apparatus having lubricant-containing polymer spacer balls is characterized as interposing each lubricant-containing polymer spacer ball between the rolling elements (balls) made of steel. Therefore, the lubricant gradually exudes from the lubricant-containing polymer spacer balls that are rolling while being in contact with the rolling elements as time elapses, so that the lubricant can be supplied not only to the surfaces of the rolling elements made of steel which are circulating while rolling but also to the surfaces of the endless rolling element circulation passages uniformly and automatically. As a result, stable lubrication can be achieved over a long period of time even in such an undesirable environment as high temperatures.

DETAILED DESCRIPTION OF THE PREFERRED EMBODIMENT

Figure 1:
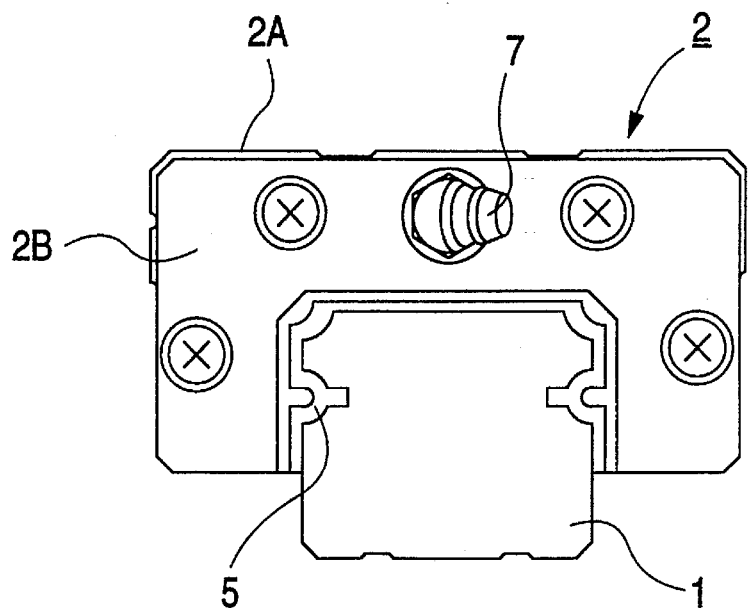
FIG. 1 is a front view of a linear guide apparatus, which is an embodiment of the present invention.

An embodiment of the present invention will now be described with reference to the drawings. The same or like parts and components as those of the conventional example are denoted as the same reference numerals.

First, the lubricant-containing polymer spacer ball of the present invention will be described in detail.

The lubricant-containing polymer spacer ball used in the linear guide apparatus of the present invention is prepared by mixing a lubricant with a polymer, heating and melting such mixture, thereafter charging the thus processed mixture into a predetermined mold, and solidifying the object in the mold by cooling while applying pressure thereto. The polymer is selected from the group including poly α-olefin base polymers that have basically the same chemical structure such as polyethylene, polypropyrene, polybutylene and polymethyl-pentane. The lubricant is selected from the group including paraffinic hydrocarbon oils such as poly α-olefin oils, naphthenic hydrocarbon oils, mineral oils, ether oils such as dialkyldiphenyl ether oils, and ester oils such as ester phthalate and ester trimellitate. Various additives such as oxidation inhibitors, anticorrosives, antiwear agents, defoaming agents, and extreme-pressure agents may also be added.

The polymers in the aforementioned group have the same basic structure but have different average molecular weights, ranging from $1 \times 10^3$ to $5 \times 10^6$. Among such polymers, the polymers having relatively low molecular weights such as those whose average molecular weight ranges from $1 \times 10^3$ to $1 \times 10^6$ and the polymers having ultra high molecular weights such as those whose average molecular weight ranges from $1 \times 10^6$ to $5 \times 10^6$ are used either singly or in combination if necessary.

In order to improve the mechanical strength of the lubricant-containing polymer spacer ball of the present invention, the following thermoplastic resins and thermosetting resins may also be added to the poly α-olefin base polymers.

As the thermoplastic resins, polyamides, polycarbonates, polybutylene telephthalate, polyphenylene sulfide, polyether sulfones, polyether etherketones, polyamideimide, polystyrene, or ABS resins can be used.

As the thermosetting resins, unsaturated polyester resins, urea resins, melamine resins, phenolic resins, polyimide resins, and epoxy resins can be used.

These resins may be used either singly or in combination.

Further, in order to disperse poly α-olefin base polymers and resins other than such polymers in a more uniform condition, an appropriate compatibilizers may also be added if necessary.

The lubricant-containing polymer spacer ball of the present invention contains 30 to 90 wt % of poly α-olefin base polymer and 10 to 70 wt % of lubricating oil with respect to the total weight. If the content of poly α-olefin base polymer is less than 30 wt %, then the spacer ball cannot be made hard enough. On the other hand, if the content of poly α-olefin base polymer exceeds 90 wt % (i.e., the content of the lubricating oil is less than 10 wt %), then the supplying of the lubricating oil is reduced, giving defective lubrication to the linear guide apparatus.

Next, the entire part of a linear guide apparatus, which is the embodiment of the present invention, will be described in detail.

Figure 2:
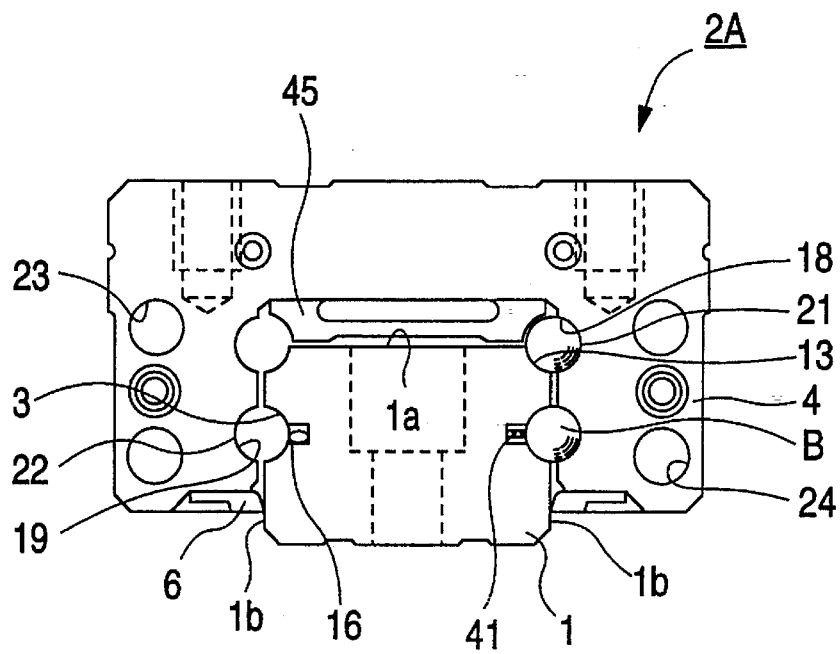
FIG. 2 is a front view of the linear guide apparatus shown in FIG. 1 with an end cap removed.

In FIGS. 1 and 2, a slider 2 that is substantially square C-shaped in cross section is mounted over a square guide rail 1 so as to be movable relative to each other in an axial direction. The slider 2 has end caps 2B detachably secured to both end portions of a slider main body 2A in the axial direction. Rolling grooves 13 are formed at ridge portions at which both side surfaces 1b meet an upper surface 1a of the guide rail 1, respectively. Each rolling groove 13 extends in the axial direction as an elongated recessed groove whose section is substantially quadrantal. Further, in the middle of each side surface 1b of the guide rail 1 is an axially extending elongated rolling groove 3 whose section is substantially semicircular A retainer 41 release groove 16 is formed on the bottom of each rolling groove 3 so as to extend in the axial direction. The retainer release groove 16 is designed to prevent balls B, which are the rolling elements, from falling away.

On the other hand, the slider 2 includes a rolling groove 18 whose section is substantially semicircular at the inner corner portion of each of both sleeve portions 4 of the main body 2A. These rolling grooves 18 confront the corresponding grooves 13 of the guide rail 1. Further, the slider 2 includes a rolling groove 19 whose section is substantially semicircular in the middle of the inner surface of each sleeve portion 4. These rolling grooves 19 confront the corresponding rolling grooves 3 of the guide rail 1.

Both the rolling grooves 13 of the guide rail 1 and the rolling grooves 18 of the slider 2 provide a load rolling groove 21. In addition, the rolling grooves 3 of the guide rail and the rolling grooves 19 of the slider provide a load rolling groove 22.

Further, the slider main body 2A includes a rolling element return groove 23 in the upper thick-walled portion of each sleeve portion 4. These return grooves 23 are formed of through holes that are circular in section and that extend axially in parallel with the rolling grooves 18. The slider main body 2A includes a rolling element return groove 24 in the lower thick-walled portion of each sleeve portion 4. These return grooves 24 are similarly formed of through holes that extend axially in parallel with the rolling grooves 3.

Each end cap 2B is an injection-molded article made out of synthetic resin and has a substantially square C-shaped section. A surface (i.e., the back surface) of the end cap which is to be fitted with the slider main body 2A has not only an upper recess and a lower recess formed up and down on each of both sleeve portions (not shown), the recesses being sloped and semicircular, but also a semicylindrical recessed groove formed so as to traverse the middle portions of the semicircular recesses. A semicylindrical return guide (not shown) is engaged with the semicylindrical recessed groove, so that semi-doughnutlike curved grooves whose section is circular are formed on both upper and lower sides. The end caps 2B of such structure are fitted with the slider main body 2A. The upper side rolling grooves 18 of the slider main body 2A are allowed to communicate with the rolling element return grooves 23 by the corresponding curved grooves. Further, the lower side rolling grooves 19 are allowed to communicate with the rolling element return grooves 24 by the corresponding curved grooves. As a result, the endless rolling element circulation passages can be formed. A large number of steel balls B and lubricant-containing polymer spacer balls B1 are rollably loaded into the upper and lower side endless rolling element circulation passages that are formed of the rolling grooves 18 and 19, the rolling element return grooves 23 and 24, and the curved grooves.

Figure 3:
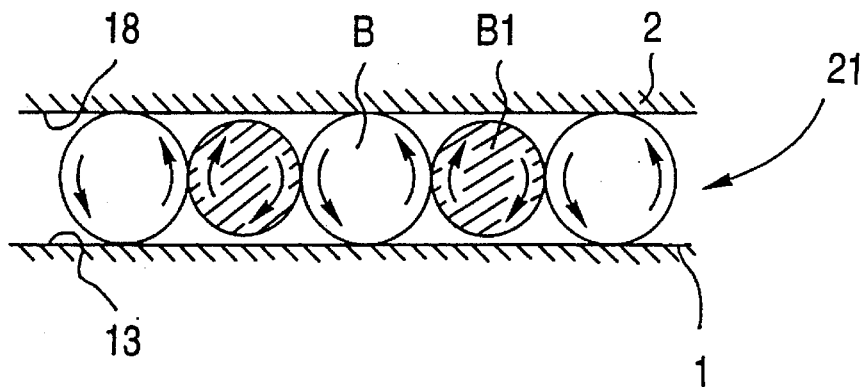
FIG. 3 is a sectional view showing a main portion of the embodiment of the present invention in cutaway form.
Figure 4:
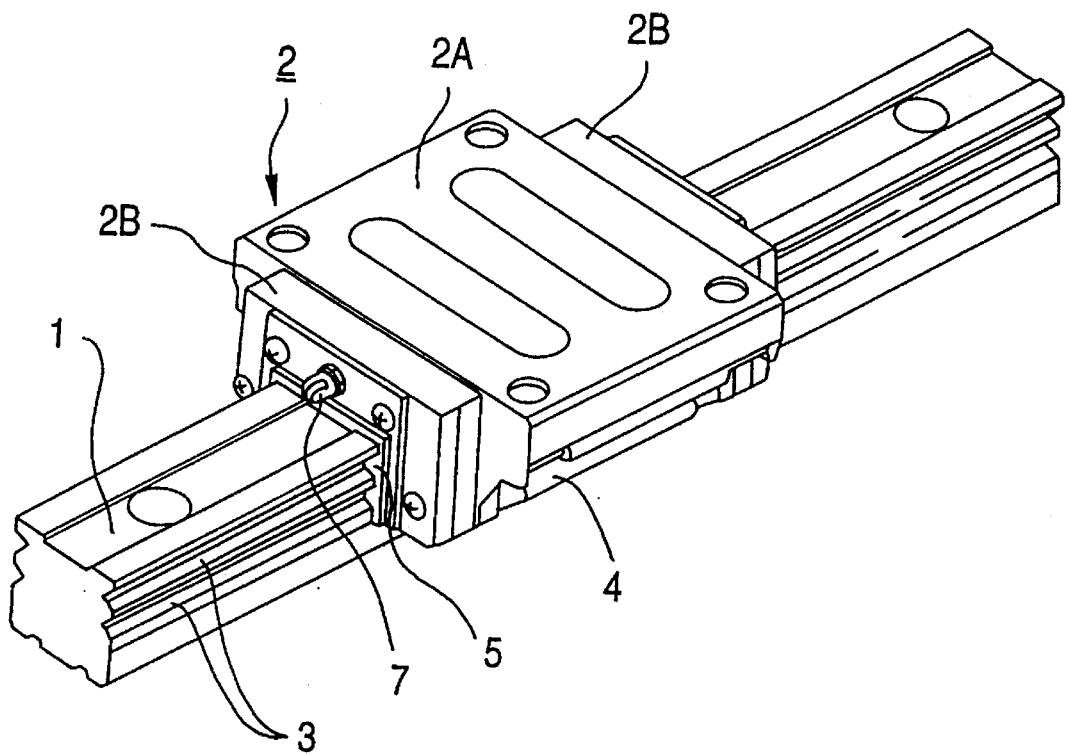
FIG. 4 is a perspective view of the entire part of a conventional linear guide apparatus.

FIG. 3 shows a row of balls loaded into the load rolling groove 21 formed of the rolling grooves 13 of the guide rail 1 and of the rolling grooves 18 of the slider 2. In this embodiment the lubricant-containing polymer spacer balls B1 are arranged so that the ball B1 alternates with the steel balls B. The size of the spacer ball B1 is designed to be slightly smaller than the steel ball B so as to improve operability. Each lubricant-containing polymer spacer ball B1 is made by molding out of polyethylene composed of 65 wt % of low-molecular-weight polyethylene (whose molecular weight ranges from $1 \times 10^3$ to $5 \times 10^5$) ("PZ50U" manufactured by Mitsubishi Petrochemical Co., Ltd.) and 5 wt % of ultra-high-molecular weight polyethylene (whose molecular weight ranges from $1 \times 10^6$ to $5 \times 10^6$) ("MIPERON XM220" manufactured by Mitsui Petrochemical Industries, Ltd.), with an addition of 30 wt % of paraffin base mineral oil ("FBKRO100" manufactured by Nippon Oil Co., Ltd.) as a lubricant.

The operation of the thus constructed linear guide apparatus will be described next.

When the slider 2 moves along the guide rail 1 that is fixed on a table, the balls B and the spacer balls B1 repeat such circulation as to move at a speed lower than that of the slider 2 in the slider moving direction while rolling within the load rolling groove 21 and 22, make a U-turn at the curved groove 38 on one end, move along the rolling element return groove 23 and 24 while rolling in the opposite direction, and then make another U-turn at the curved groove 38 on the other end to thereby return to the load rolling groove 21 and 22.

During the rolling, the spacer balls B1 that are rolling while being in contact with the balls B gradually exude the lubricant as time elapses to allow the lubricant to be automatically supplied to the rolling steel balls B or to the surfaces of the endless rolling element circulation passages. Because of such an operation the stable lubrication is achieved over a long period of time. Hence, smooth operation can be performed for a long period of time without making a special arrangement for supplying the lubricant to the slider 2 from an external source.

While the case where the lubricant-containing polymer spacer ball B1 alternates with the ball B in the aforementioned embodiment, the arrangement of the balls B1, B are not limited thereto. For example, the lubricant-containing polymer spacer ball B1 may be arranged at intervals of a plurality of balls.

Further, it may be so arranged that grease or lubricating oil is supplied also from a grease nipple 7 of the slider 2 in addition to the lubricant supplied from the lubricant-containing polymer spacer balls, so that the grease or the lubricating oil can be sealed in the internal space between the guide rail 1 and the slider 2.

Still further, a linear guide apparatus to which the present invention is applicable is not limited to the type to which the aforementioned embodiment belongs. For example, the present invention may be applicable to a linear guide apparatus having two rows of rolling grooves on a single side.

As described above, the present invention is characterized as interposing the lubricant-containing polymer spacer balls between the rolling elements that roll within the slider of the linear guide apparatus. Therefore, the lubricant-containing polymer spacer balls gradually exude the lubricant as time elapses to thereby allow the lubricant to be automatically supplied to the rolling elements and to the endless rolling element circulation passage. As a result, the present invention can provide a linear guide apparatus implementing long life and satisfactory self-lubrication.

What is claimed is:

1. A self-lubrication linear guide apparatus comprising:
   an axially extending guide rail having a first rolling groove on its outer surface;
   a slider engaged with the guide rail and having a second rolling groove, rolling element return grooves and curved grooves, the second rolling groove confronting the first rolling groove, the rolling element return grooves being coupled to both end portions of the second rolling groove through the curved grooves, respectively;
   a plurality of rolling elements loaded into the slider to be made circulatable through the second rolling groove, the curved grooves, and the rolling element return grooves; and
   a plurality of spacer balls interposed between the rolling elements, the spacer balls being formed of lubricant-containing polymer.

2. The self-lubrication linear guide apparatus of claim 1, wherein the first rolling groove includes an upper first rolling groove which is formed at a ridge portion of the guide rail and a lower first rolling groove which is formed at a side surface of the guide rail, and the second rolling groove includes upper and lower second rolling grooves which confront the upper first rolling groove and the lower first rolling groove, respectively, to circulate the rolling balls.

3. The self-lubrication linear guide apparatus of claim 1, wherein each of the spacer balls has dimensions smaller than the rolling elements.

4. The self-lubrication linear guide apparatus of claim 1, wherein each of the spacer balls includes 30 to 90 wt % of poly $\alpha$-olefin base polymer selected from the group consisting of polyethylene, polypropyrene, polybutylene and polymethyl-pentane, and 10 to 70 wt % of a lubricant selected from the group consisting of poly $\alpha$-olefin oil, naphthenic hydrocarbon oil, mineral oil, ether oil and ester oil.

5. The self-lubrication linear guide apparatus of claim 4, wherein the poly $\alpha$-olefin base polymer includes thermoplastic resin selected from the group consisting of polyamide, polycarbonate, polybutylene telephthalate, polyphenylene sulfide, polyether sulfone, polyether etherketone, polyamideimide, polystyrene and ABS resin.

6. The self-lubrication linear guide apparatus of claim 4, wherein the poly $\alpha$-olefin base polymer includes thermosetting resin selected from the group consisting of unsaturated polyester resin, urea resin, melamine resin, phenolic resin, polyimide resin and epoxy resin.

7. The self-lubrication linear guide apparatus of claim 1, wherein the lubricant-containing polymer includes a lubricant which gradually exudes from the spacer balls for supplying the lubricant automatically to the rolling elements, the first rolling groove, the second rolling groove, the rolling element return grooves and the curved grooves.

\* \* \* \* \*